June 5, 1945.   J. F. KOKOSKA   2,377,502
PARACHUTE
Filed July 18, 1941    2 Sheets-Sheet 1
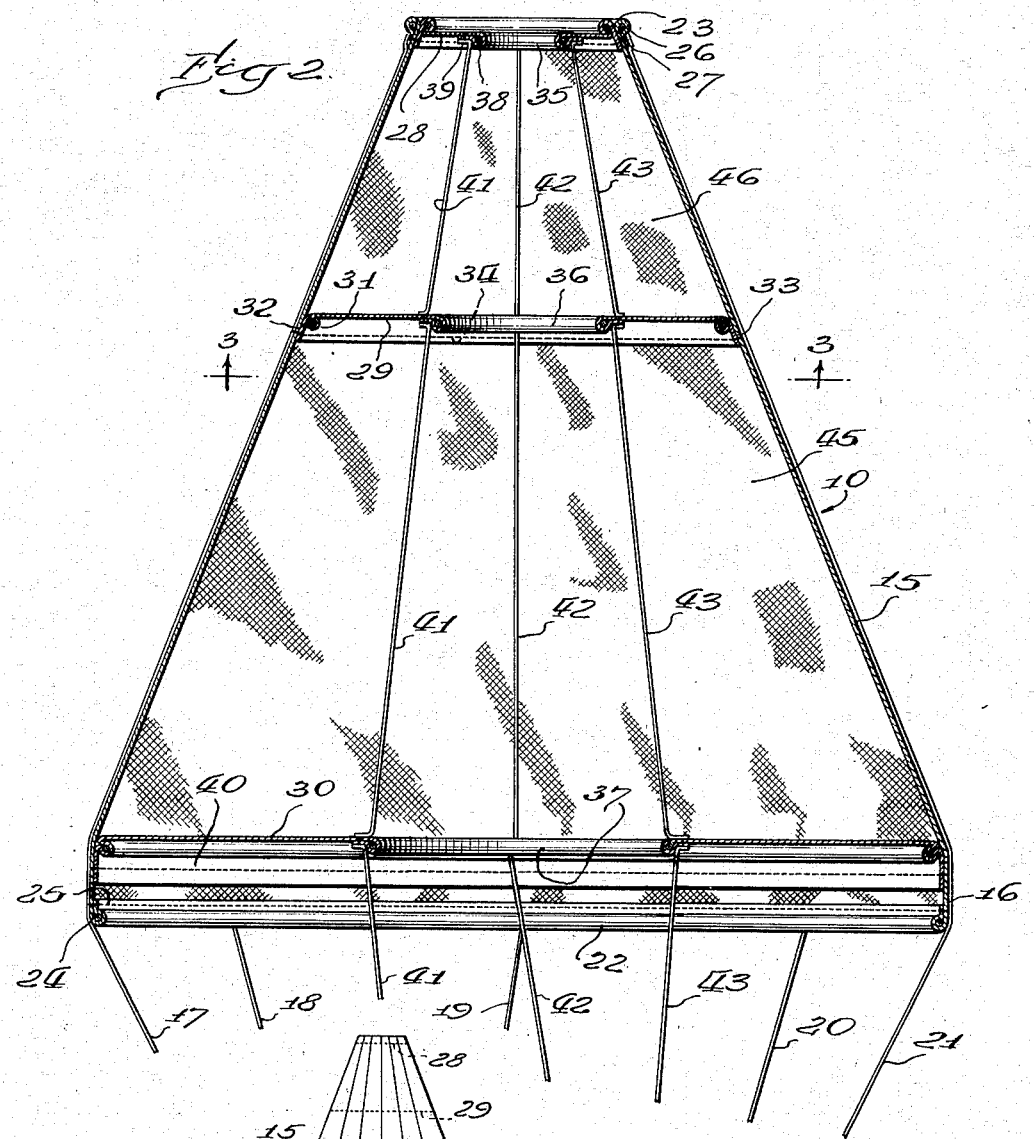
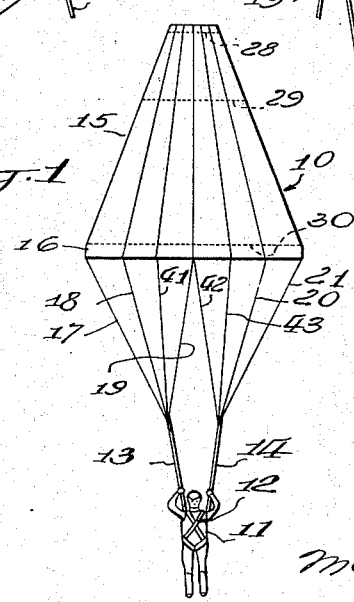
Inventor:
John F. Kokoska
By McCaleb, Hendt & Dickinson
Attys June 5, 1945. J. F. KOKOSKA 2,377,502
PARACHUTE
Filed July 18, 1941 2 Sheets-Sheet 2
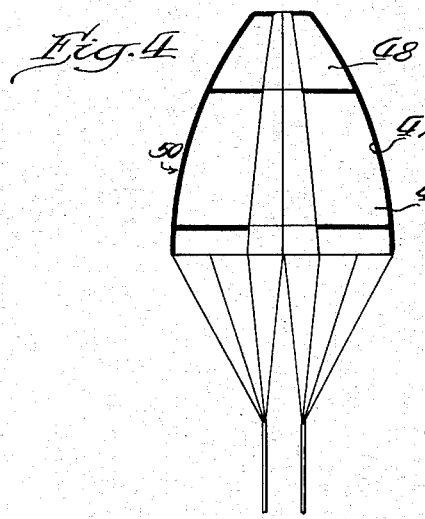
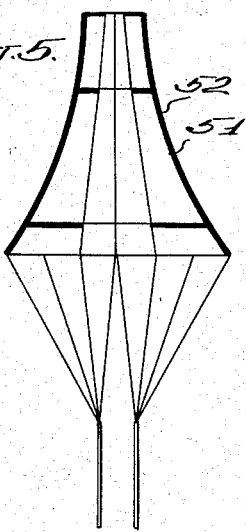
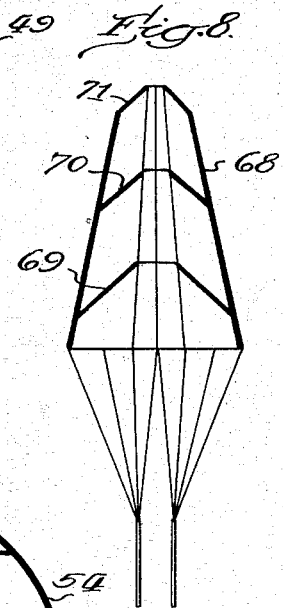
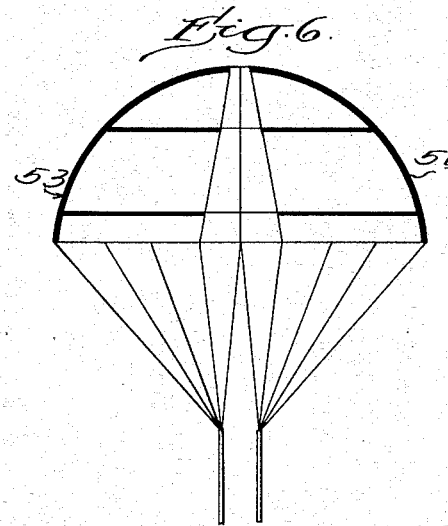
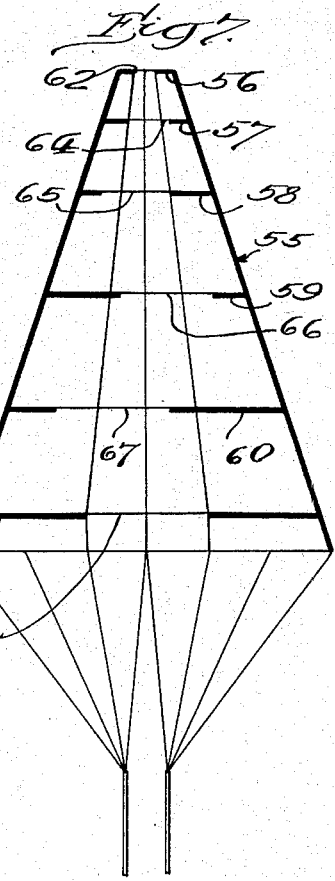
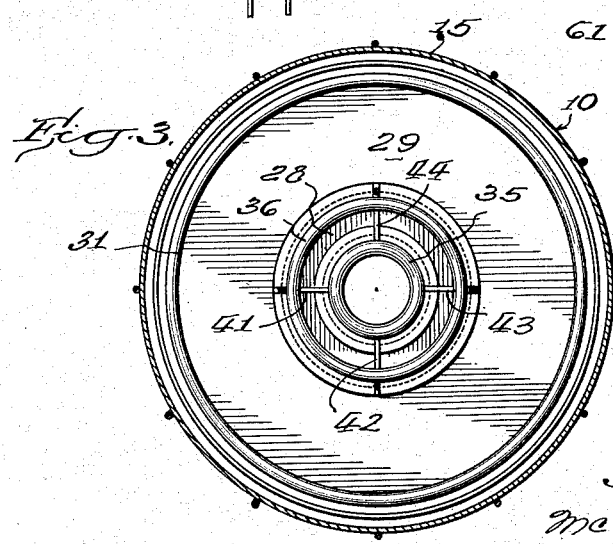
Inventor
John F. Kokoska
By McCaleb, Wendt & Dickinson
Attys.

Patented June 5, 1945

2,377,502

UNITED STATES PATENT OFFICE 2,377,502

PARACHUTE

John F. Kokoska, Cicero, Ill.

Application July 18, 1941, Serial No. 402,908

14 Claims. (Cl. 244—142)

The present invention relates to parachutes, and is particularly concerned with the provision of parachutes of the type adapted to be used by aviators for safe descent in emergencies, but the parachutes are capable of general use, and may be used for effecting a gradual and safe descent to the earth of persons, devices, or any type of machines or articles that can be supported by a parachute.

One of the objects of the invention is the provision of an improved parachute which has the characteristic of a quick and positive opening and of a slower rate of descent than the parachutes of the prior art of the same size supporting the same weight.

Another object of the invention is the provision of an improved parachute which may be made of smaller size than the devices of the prior art for supporting the same amount of weight.

Another object of the invention is the provision of a parachute which need not be constructed of silk, and which may be made of various more durable types of fabric, such as linen, cotton, wool, or any type of light and flexible fabric or material, although silk may also be used, if desired.

Another object of the invention is the provision of a parachute which requires little or no skill in its packing by reason of the fact that the parachute does not have to be packed according to the methods of the prior art, but can be packed in a very simple way.

Another object of the invention is the provision of an improved parachute of the class described, which needs no pilot chute (although a pilot chute may be used, if desired), which is adapted to be guided, and which is adapted to be manufactured and maintained in good operative condition much more economically than any of the devices of the prior art.

Another object of the invention is the provision of a parachute which may be used with certainty of safety at relatively low altitudes by reason of its quick and positive opening and its slow rate of descent.

Another object is the provision of an improved parachute which has a lesser tendency than the devices of the prior art to drag the parachutist along the ground after landing.

Another object of the invention is the provision of an improved parachute of the class described in which the supporting shrouds and the baffles and the housing have their parts so arranged as to provide the maximum strength in the direction in which the forces are normally applied to them so that there is no tendency toward ripping loose of the baffles or cords.

Other objects and advantages of the invention will be apparent from the following description and the accompanying drawings, in which similar characters of reference indicate similar parts throughout the several views.

Referring to the dawings,

Fig. 1 is a vertical elevational view of the parachute, with the parachute fully opened and supporting a person during a safety descent through the air;

Fig. 2 is a vertical sectional view, taken through a relatively small parachute constructed according to the invention, showing the details of construction of the fabric parts of the parachute;

Fig. 3 is a horizontal sectional view, taken on the line 3—3 of Fig. 2, looking in the direction of the arrows;

Fig. 4 is a diagrammatic sectional view, showing the form and construction of a modification in which the outer casing of the parachute assumes an approximately parabolic form, with convexly formed walls;

Fig. 5 is another diagrammatic sectional view of another modified form of parachute, in which the outer casing has concavely curved walls;

Fig. 6 is a similar view of another modification, in which the outer casing of the parachute is of the deep parasol type;

Fig. 7 is a similar view of a relatively long conical parachute modification, utilizing a multiplicity of baffles;

Fig. 8 is a similar diagrammatic sectional view, showing a parachute of the same type, provided with tapered baffles.

Referring to Figs. 1 to 3, 10 indicates in its entirety a parachute constructed according to the invention which is shown in Fig. 1, in the course of supporting a person, indicated at 11. The user of the parachute may be provided with any standard form of parachute harness 12, but the harness is preferably of the type having two points of support for the main supporting members 13 and 14, which are secured to the harness 12 in such position that they may be grasped by the hands of the user 11 in guiding the parachute.

I desire it to be understood that the present parachute may be made in any desired size, and the size of the parachute is determined by the amount of weight which it is intended to support and the rate of descent which is desired when utilized with this predetermined weight.

The location and number of the shrouds or supporting cords is merely exemplary of one form of a parachute, and it should be understood that the number of supporting and reinforcing cords is increased in relation to the size of the parachute and the weight to be supported.

In general, the reinforcing cords and supporting shrouds should be symmetrically disposed with respect to the axis of the parachute so as to support the weight in balanced position below the parachute.

While the present parachute may also be made out of silk, if desired, this relatively perishable material requires extreme care in handling and packing and maintenance, and it is one of the objects of the invention to provide a parachute which does not have to be made of silk, but in which various types of more durable fabrics and materials may be used.

Among the fabrics that can be used are those woven of any of the various animal, vegetable, and mineral fibers, such as linen, cotton, wool, "nylon," "rayon," spun glass, rubberized fabric, and pure thin para rubber sheets suitably treated to prevent adhesion.

One of the preferred forms of the parachute is constructed out of pure linen fabric, and I desire it to be understood that the term "fabric" as employed in the present specification and claims includes any thin sheet material the walls of which are free from adhesion to each other and which may be manufactured or fabricated in any way.

The parachute 10 preferably includes a relatively deep or long outer housing 15, which tapers towards its upper end and has sufficient space inside to house one or more baffles.

In the embodiment illustrated in Fig. 2 this housing 15 has its main body of substantially conical shape, but is provided with a downwardly extending flange or edge portion 16, which may be conical or cylindrical. The outer casing 15 in provided with a plurality of supporting shrouds 19 to 21, which comprise strong cords or ropes of cotton, linen, jute, or other suitable material.

The shrouds 17 to 21 are continued above the lower rim 22 of the parachute and extend along the sides of the parachute to the upper rim 23 in the form of reinforcing cords stitched to or housed in a portion of the casing 15. These cords are preferably located at seams, but not necessarily, since there may be more cords than there are seams, and they may be surrounded by a part of the fabric of the casing 15 or enclosed by means of tape, which surrounds the cords and is stitched to the outer casing 15.

At its lower edge 22, the casing 15 is turned about another reinforcing cord 24 and stitched back upon itself by a line of stitching 25. At its upper edge 23 the outer casing 15 is also turned about a hoop 26 of reinforcing cord and stitched back upon itself by a line of stitching 27.

The outer casing 15 preferably supports a plurality of fabric baffles 28, 29, 30 of the same material or fabric of which the outer casing 15 is made. These baffles are preferably circular in form, and each is preferably provided at its circular edge with a reinforcing cord 31 secured in the edge portion, which is folded back over the cord and stitched by a line of stitching 32.

A downwardly extending flange portion 33 extends from the reinforced bead about the cord 31 and is secured by a line of stitching 34 or other suitable securing means to the outer casing 15.

It should be understood that wherever stitching is employed for woven fabrics, in some cases other forms of securement, such as cementing, vulcanizing, or interweaving may be employed. The essential thing is that the baffles and other parts of the parachute must be securely and safely held together in predetermined form without possibility of release, tearing, ripping of the parts, or adhesion of parts that are not supposed to be secured together.

Each of the baffles 28 to 30 is provided with a reinforced aperture 35, 36, 37, and the apertures are formed by folding back the fabric about a reinforcing cord 38 and securing it by a line of stitching 39.

The apertures 35, 36 and 37 taper in size from the bottom toward the top of the parachute in order that the increased resistance to the flow of air to the successive chambers in the parachute may cause the outer casing 15 to be quickly and fully extended.

In the parachute of Fig. 2 the apertures 35—37 are centrally located, but this admits of some modification as is illustrated in figures further to be described. The uppermost baffle 28 may be eliminated, provided the upper rim 23 of the outer casing 15 is itself sufficiently contracted to permit only a small aperture for egress of the air.

In the embodiment of Fig. 2 this baffle 28 is secured to the outer casing 15 by the same line of stitching 27, which secures the reinforcing cord 26 to the upper end of the outer casing 15.

The lowermost baffle 30 of Fig. 2 is preferably located slightly upwardly of the lower edge 22 of the outer casing 15 so as to form a cup-like chamber or cavity 40 at the bottom of the parachute, which is open at the bottom to receive the air which supports the parachute.

While the baffles 28 to 30 are relatively flat in Fig. 2, it should be understood that the final shape of these baffles in operation depends upon the length of the supporting shrouds which are secured to the reinforcing cords surrounding the apertures 35 to 37; and in use a baffle which is otherwise substantially flat may be filled out into a rounded upwardly tapered form.

All of the baffles preferably have their attaching portions downwardly turned so that they may be stitched to the housing below the body of the baffle and so that a maximum strength is provided. In this manner there is no tendency toward ripping of the baffle from the housing by the pressure which is applied to the baffle.

In addition, the shrouds 17 to 21 secured to the outer rim of the parachute 10, the baffles 28 to 30 are also preferably provided with supporting shrouds 41, 42, and 43, and others not shown, such as the one opposite the shroud 42.

These shrouds 41 to 44 extend from the reinforced rim of the aperture 35 to the reinforced rim of the aperture 36, where they are also secured; thence to the reinforced rim of the aperture 37 in the baffle 30; and thence downward to the main supporting members 13 and 14.

Half of the shrouds have their lower ends grouped and secured together, and secured to the main supporting member 13; and the other half of the shrouds, located on the other side of the parachute, are similarly grouped and secured to the main supporting member 14. Thus a pull on one of these supporting members is adapted to cause the parachute to tilt slightly and spill out air at one side of the lower edge of the parachute in such manner that it tends to slide sidewise as it descends.

Thus the operator is adapted to guide the present parachute in a manner similar to the devices of the prior art.

The resulting structure comprises a relatively deep tapered outer casing of fabric or flexible material which has a cup-shaped open portion at the bottom that is partially closed by the lowermost baffle, having a relatively large aperture 37. The second chamber 45 receives air through the aperture 37 and discharges it through a smaller aperture 36 in the baffle 29. The third tapered chamber 46 receives air through the aperture 36 of baffle 29 and discharges it through the smaller discharge aperture 35 at the top in the baffle 28.

The shrouds 17 to 21 and the supporting shrouds 41 to 43 and others which may be provided in larger parachutes all are preferably firmly secured to any other reinforcing cords which they may intersect or contact by stitching, knotting, or tying with auxiliary cords.

The supporting shrouds 41 to 43 and others in some cases consist of one cord each, extending over their full length, in which case they may be looped around and stitched on, or otherwise secured to any reinforcing cords which are located at the apertures 35, 36, 37, or otherwise.

Where separate cords are used at 41 to 43, between the baffles, the cord preferably passes through the aperture 35, 36, or 37, and is secured to the fabric and reinforcing cord of the aperture on the opposite side. This provides a maximum strength. Thus the cords 43 at the aperture 36 would each pass through the aperture 36 and have their ends secured to the fabric of the baffle 29 on the opposite sides of the baffle.

Referring to Fig. 4, this is a modified parachute 50, illustrating the fact that the outer casing 15 need not be of strictly conical form. In this case the outer casing is made of a plurality of gores suitably shaped and stitched together so that the outer casing, indicated by the numeral 47, is outwardly convex, although it still tapers toward its upper end, and is of a sufficient depth to receive a plurality of baffles and house a plurality of chambers 48, 49.

In Fig. 5 the parachute 51 is of similar construction except that its outer casing 52 is formed of a plurality of gores suitably shaped and stitched, or otherwise secured, so that its outer casing 52 is concave on its outer side and convex on its inner side.

Here again the outer casing 52 is tapered from its lower end toward its upper end, and is of sufficient depth to receive a plurality of baffles.

Fig. 6 is another modified parachute 53 of the rounded or parasol type, the outer casing 54 of which is made of a plurality of gores or pieces, to approximate the spherical form. Here the casing is again of sufficient depth to house a plurality of baffles, but the uppermost baffle may be eliminated, as the outer casing is of such shape as to facilitate the provision of a relatively small discharge aperture.

Referring to Fig. 7, this illustrates a parachute embodying the invention, of the elongated conical type, having a conical outer casing 55 of greater length and adapted to support a multiplicity of baffles 56 to 61. While the baffles may have their apertures centrally located, as shown in Fig. 2, it is also possible to have only the uppermost aperture 62 and the lowermost aperture 63 centrally located, while the rest of the apertures 64, 65, 66, and 67 may be eccentrically located.

If desired, the apertures 64 to 67 may be alternately located at the opposite sides of the parachute, or they may be located with their centers in the line of a spiral. This eccentric location of the apertures in the intermediate baffles introduces additional resistance to the flow of the air through the parachute and tends to decrease the rate of descent of the parachute for a given amount of weight in a parachute of predetermined size.

In all cases the apertures in the baffles preferably decrease in size from the bottom toward the top of the parachute for the purpose of assuring full extension of the parachute.

Referring to Fig. 8, this is another modification, in which the outer casing 68 may take the shape of any of those previously described; but the baffles 69, 70 and 71 are preferably upwardly tapered from their outer rim toward their discharge apertures. This facilitates the flow and guides the flow of the air toward the passages through the baffles and thus tends to hasten the full spread of the parachute.

The operation of my parachute is as follows: The parachute does not need to be packed by persons specially skilled in the packing of parachutes, and it does not need to be constructed of silk. Parachutes constructed of ordinary closely woven linen have been rolled up into a compact roll with the top of the parachute disposed innermost of the spiral convolutions of the roll and the bottom of the parachute at the outer edge of the roll.

It has been found that such parachutes will open more quickly than the approved devices of the prior art, and will descend more slowly than the devices of the prior art of the same size, utilizing the same amount of weight.

The air catches in the cup-like cavity 40 of the lowermost part of the parachute and is discharged through the relatively large aperture into the chamber 45.

The additional resistance imposed on the passage of the air by the still smaller discharge aperture 36 of this chamber tends to cause the outer casing surrounding this chamber to be fully extended, and the air is discharged from the chamber 45 into the chamber 46.

In a similar manner the increased resistance imposed upon the flow of air by the still smaller aperture 35 tends to cause the outer casing 15 of the chamber 46 to be fully distended, whereupon the chute is adapted to support the full amount of predetermined weight that is placed upon it.

While these steps of the operation have been described successively, it is to be understood that they take place almost instantaneously or in such quick succession that it is practically impossible to determine the time involved in each step of opening of the parachute.

The present parachutes are adapted to be guided like any of the parachutes of the prior art, and they have the characteristics of quick and positive opening and slower descent than prior parachutes of a given size with a predetermined weight. If desired, a smaller size of parachute of this type may be utilized to support the same weight that would be carried by a larger parachute of the prior art. The necessity for utilizing silk is eliminated; since the present parachutes may be made of linen or other fabrics, they need not be repacked at frequent intervals like the silk parachutes of the prior art, and only a simplified packing is necessary, which requires little or no skill.

No pilot chute need be employed; but, if desired, a pilot chute may be used.

The center cords assure the quick opening of the parachute by supporting the baffles against the flow of the air, while the outer shrouds keep the brim of the parachute down. The lowermost baffle, being located above the lower edge of the parachute, forms a recess to catch the air and effect a quick opening, and the present parachute is adapted to descend slowly and steadily without unnecessary oscillation or other movement which might disturb its equilibrium or diminish its safety.

The parachutes may be manufactured at a lower cost according to mass production methods, and may be maintained in good condition for use by means of a very simple packing, which does not cause the parachute to deteriorate.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A parachute having the characteristic of quick and positive opening, comprising an outer casing of relatively flexible material, open at its lower end and tapering in size toward its upper end, and means for successively restricting to a greater extent the flow of air through said casing, comprising a plurality of baffles of flexible sheet material secured to said outer casing and spaced from each other inside said casing, said baffles being provided with apertures for the passage of air, and the apertures being successively smaller in size toward the top of said parachute.

2. A parachute having the characteristic of quick and positive opening, comprising an outer casing of relatively flexible material, open at its lower end and tapering in size toward its upper end, and means for successively restricting to a greater extent the flow of air through said casing, comprising a plurality of baffles of flexible sheet material secured to said outer casing and spaced from each other inside said casing, said baffles being provided with apertures for the passage of air, and the apertures being successively smaller in size toward the top of said parachute, the lowermost of said baffles being spaced from the lower rim of said parachute to form a pocket for catching the air and initiating the opening of the parachute.

3. A parachute having the characteristic of quick and positive opening, comprising an outer casing of relatively flexible material, open at its lower end and tapering in size toward its upper end, and means for successively restricting to a greater extent the flow of air through said casing, comprising a plurality of baffles of flexible sheet material secured to said outer casing and spaced from each other inside said casing, said baffles being provided with apertures for the passage of air, and the apertures being successively smaller in size toward the top of said parachute, said casing being provided with a plurality of symmetrically located supporting tension members grouped in two groups, whereby the user may control the direction of descent of the parachute.

4. A parachute having the characteristic of quick and positive opening, comprising an outer casing of relatively flexible material, open at its lower end and tapering in size toward its upper end, and means for successively restricting to a greater extent the flow of air through said casing, comprising a plurality of baffles of flexible sheet material secured to said outer casing and spaced from each other inside said casing, said baffles being provided with apertures for the passage of air, and the apertures being successively smaller in size toward the top of said parachute, said casing being provided with a plurality of symmetrically located supporting tension members grouped in two groups, whereby the user may control the direction of descent of the parachute, said baffles being secured successively to supporting cords, which in turn are secured to said groups of cords to assure the opening of the parachute through the action of the baffles.

5. A parachute of fabricated sheet material adapted to be preserved in good condition for quick opening by simplified packing over a long period of time, comprising a tapered outer fabric casing having a relatively small aperture at the top and having its lower end open, and a baffle of fabric secured to the inside of said casing at a point spaced from the lower rim of said casing to form a pocket for catching the air and initiating the opening of the parachute, said baffle having a centrally located aperture of larger size than the aperture in the upper end of said parachute, and a plurality of supporting shrouds secured to the lower rim of said parachute casing and other shrouds secured to said baffle adjacent its centrally located aperture for exerting a force on the parachute to assure a quick opening, and a second baffle located in said parachute between the upper end and the lower baffle, said second baffle having an aperture of a size intermediate between the aperture in the lower baffle and the aperture in the top of the parachute.

6. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute.

7. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute, and a plurality of shrouds secured to said baffles at points spaced from the wall of said casing to support the baffles in predetermined position.

8. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute, and a plurality of shrouds secured to said baffles at points spaced from the wall of said casing to support the baffles in predetermined position, said outer casing being substantially conical in shape, and the lowermost of said baffles being spaced from the lower rim of said parachute to form a pocket for catching the air to initiate the opening of the parachute.

9. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute, and a plurality of shrouds secured to said baffles at points spaced from the wall of said casing to support the baffles in predetermined position, said baffles being concavely shaped surrounding their apertures.

10. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute, and a plurality of shrouds secured to said baffles at points spaced from the wall of said casing to support the baffles in predetermined position, said outer casing being formed with an outwardly convex shape.

11. In a parachute of the class described, the combination of an upwardly tapered outer flexible fabric casing, said casing being formed with a relatively small aperture at its upper end, and having its lower rim secured to a plurality of regularly spaced shrouds, and a plurality of fabric baffles secured to the inner wall of said casing in spaced relation to each other, each of said baffles being provided with an aperture, and said apertures being graduated in size from the largest aperture at the lowermost baffle to the small aperture at the upper end of the parachute, and a plurality of shrouds secured to said baffles at points spaced from the wall of said casing to support the baffles in predetermined position, said outer casing having its outer wall formed with a concavity.

12. In a parachute of the nonrigid type having the characteristics of quick and positive opening, comprising an outer casing of flexible fabric, said casing being relatively large at the bottom and relatively small at the top and tapering from the bottom toward the top, a baffle in the upper end of said casing having a centrally located circular aperture and a lower baffle located close to but slightly spaced from the lower end of said casing, said lower baffle having a centrally located aperture and said casing having a depending rim surrounding said lower baffle, and an intermediate baffle in said housing, said intermediate baffle also having a centrally located aperture, the apertures in said baffles diminishing in size from the lower baffle to the intermediate baffle to the upper baffle, whereby the air is caught in the lowermost rim of the casing and caused to pass through the lower baffle into the chamber above it, the aperture of reduced size above this chamber restricting the flow out of the chamber over that passing into the chamber to effect a quick opening of that portion of the casing and passing through the intermediate baffle into the upper chamber between the intermediate baffle and the upper baffle and the restriction in size of the upper baffle serving to cause the air to effect a quick opening of the upper chamber of said casing, said baffles being also constructed of flexible fabric and being provided with support comprising a plurality of shrouds secured to the inner edges of said baffles at said apertures and extending downward for attachment to other shrouds extending from the lower edge of said casing.

13. In a parachute, the combination of a substantially frusto-conical outer flexible fabric casing, having an upper plane casing wall and a lower substantially plane casing wall, said casing being formed with a relatively small aperture in said upper plane casing wall and with a larger aperture in said substantially plane lower casing wall and having intermediate said walls a baffle provided with a centrally located aperture of intermediate size, said casing being provided with shrouds at its outer lower edge and with additional shrouds extending through said casing and attached to the upper wall, the intermediate baffle, and the lower wall.

14. In a parachute, the combination of a substantially frusto-conical outer flexible fabric casing, having an upper plane casing wall and a lower substantially plane casing wall, said casing being formed with a relatively small aperture in said upper plane casing wall and with a larger aperture in said substantially plane lower casing wall and having intermediate said walls a baffle provided with a centrally located aperture of intermediate size, said casing being provided with shrouds at its outer lower edge and with additional shrouds extending through said casing and attached to the upper wall, the intermediate baffle, and the lower wall, the said lower wall being spaced from the lowermost edge of said outer casing to form a pocket for catching the air to initiate the opening of the parachute.

JOHN F. KOKOSKA.